R. G. AND W. R. WARD.
SMELTING FURNACE.
APPLICATION FILED OCT. 4, 1916.
1,351,451. Patented Aug. 31, 1920.
4 SHEETS—SHEET 1.
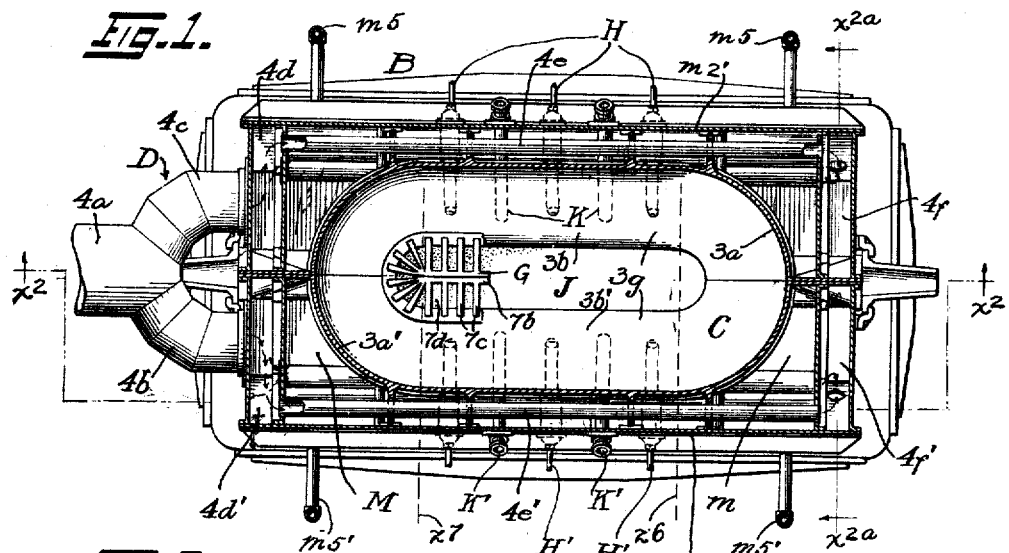
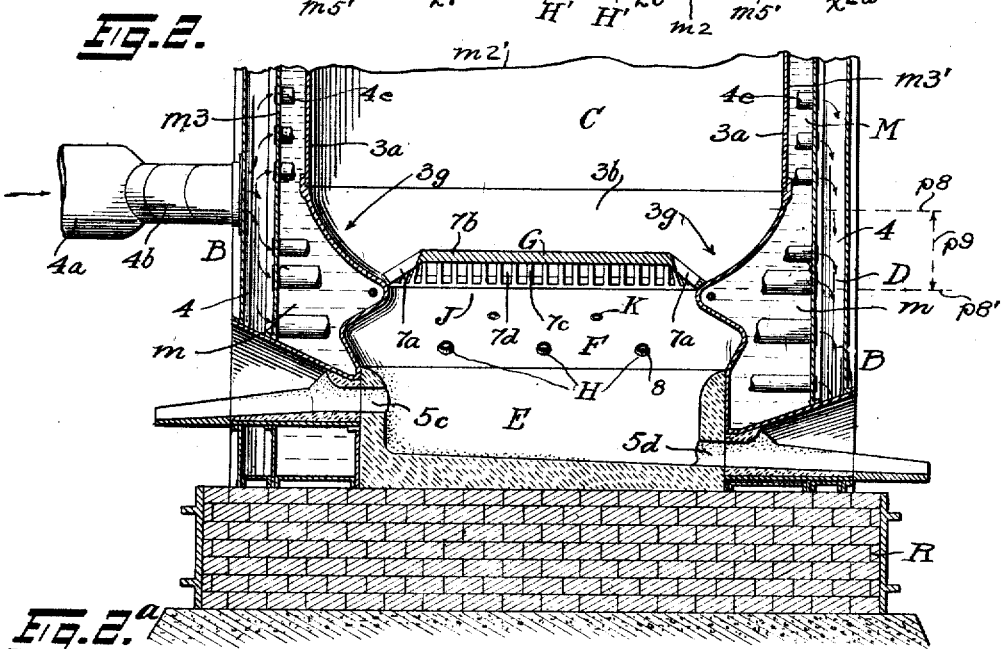
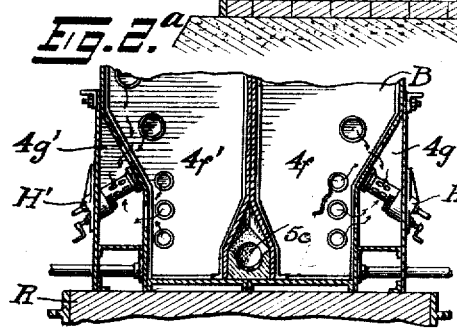
Inventors:
Randolph G. Ward.
William R. Ward.
By their Att'y. F. H. Richards.

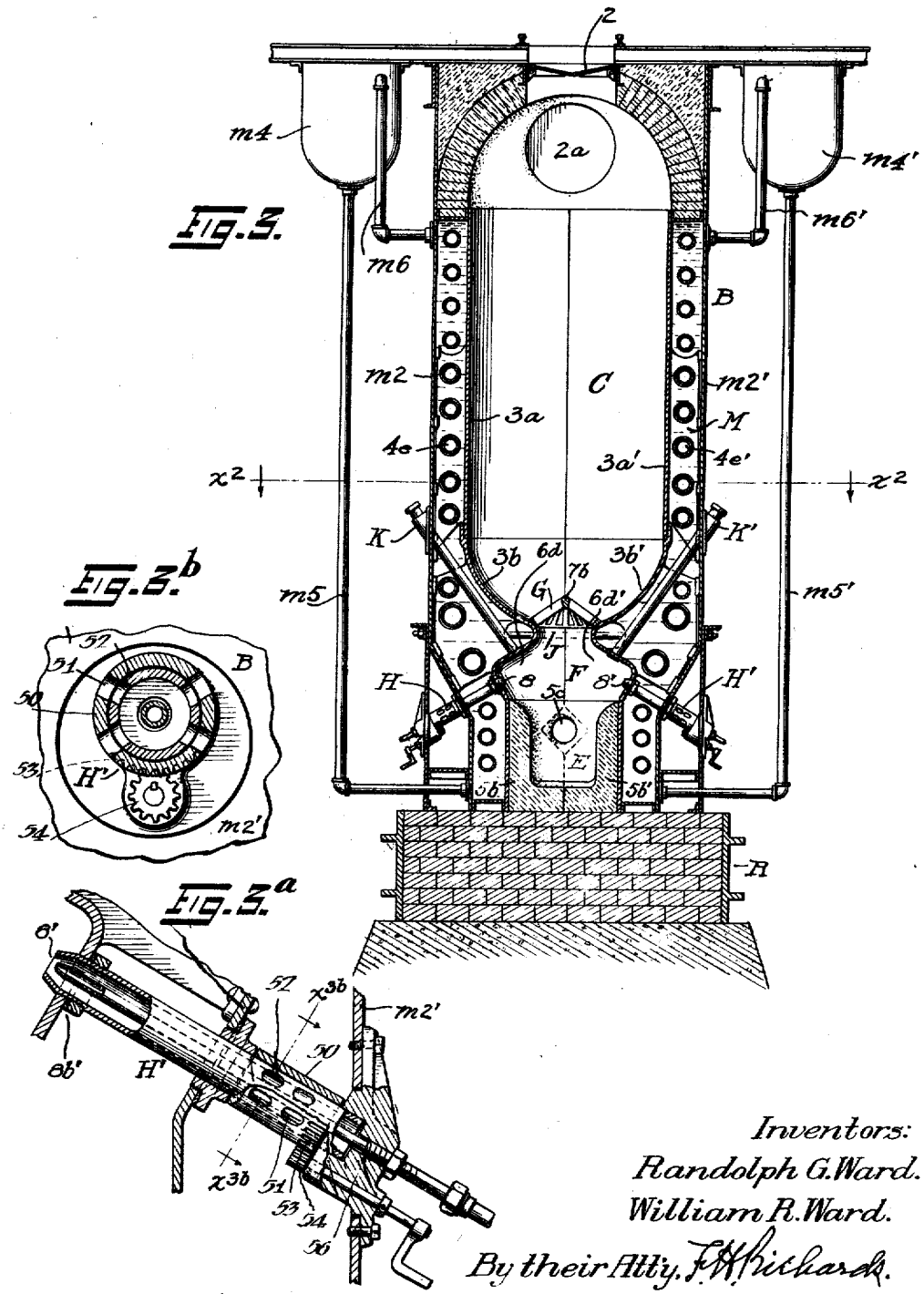

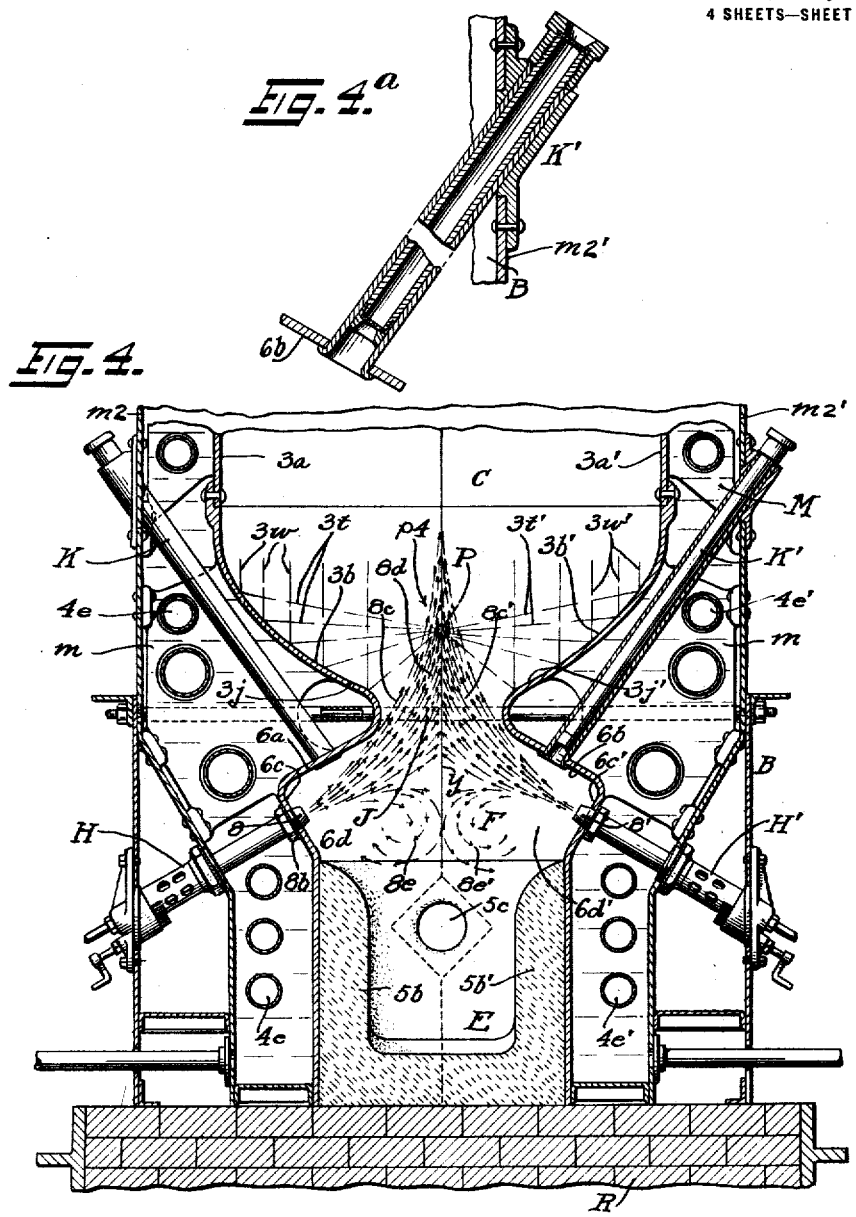

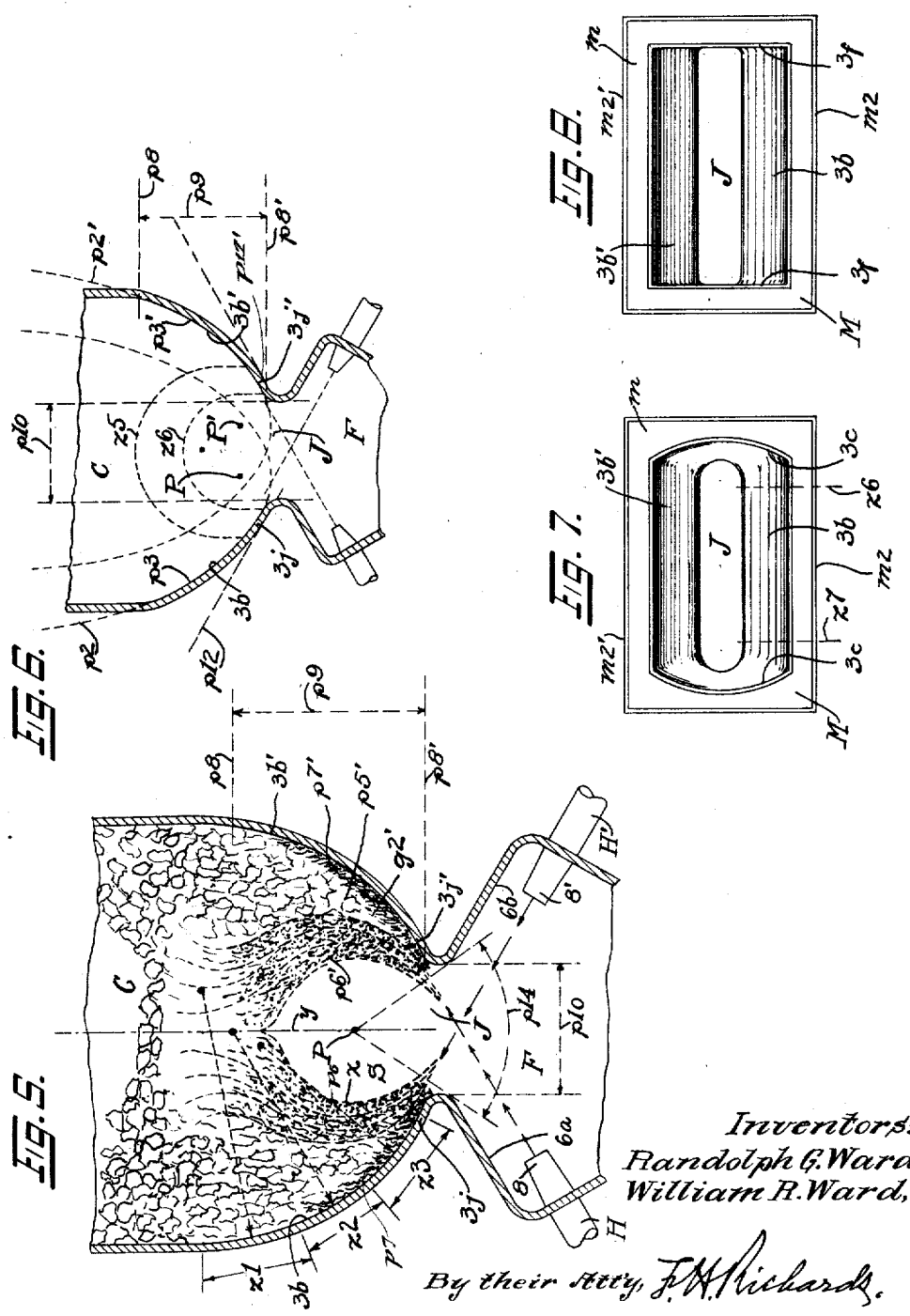

UNITED STATES PATENT OFFICE.

RANDOLPH G. WARD, OF NEW YORK, N. Y., AND WILLIAM R. WARD, OF BETHLEHEM, PENNSYLVANIA, ASSIGNORS, BY DIRECT AND MESNE ASSIGNMENTS, TO INDEPENDENT MINES SMELTING COMPANY, INC., OF NEW YORK, N. Y., A CORPORATION OF DELAWARE.

SMELTING-FURNACE.

1,351,451.  Specification of Letters Patent.  Patented Aug. 31, 1920.

Application filed October 4, 1916. Serial No. 123,612.

*To all whom it may concern:*

Be it known that we, RANDOLPH G. WARD, a citizen of the United States, residing at New York, in the county of New York and State of New York, and WILLIAM R. WARD, a citizen of the United States, residing at Bethlehem, in the county of Northampton and State of Pennsylvania, have invented certain new and useful Improvements in Smelting-Furnaces, of which the following is a specification.

Our present invention relates more especially to furnaces for use in smelting the ores of the precious and rare metals, and for reducing ores in general where the use of a non-oxidizing flame is desirable.

A principal object of our invention is to provide an improved furnace of that class, in which the heat required for smelting ores or the smelting of metals is obtained from gas or from the vaporization of suitable hydro-carbon fuels, used with a proper admixture of air, and to provide for carrying on the smelting operation in a continuous manner, and with a high efficiency; also, to overcome the numerous difficulties heretofore experienced in supporting the furnace charge above an open and obstructed chamber beneath it; and to provide for an effective mixing and combustion of the gas or vaporized mixture of oil and air, whereby these operations can be effected, maintained and properly controlled in constant and regular manner.

A further object of our invention is to provide novel and efficient means for supporting and automatically sustaining the furnace charge above an open and unobstructed combustion chamber beneath the furnace hearth, and thus also provide, in furnaces of the shaft or vertical type, an effective utilization of fluid fuels, such as gas or a vaporized mixture of oil and air, in the arts of smelting ores and the melting or reduction of metals.

Another object of our invention is to furnish, as hereinafter set forth, a method of and improved means for "blowing-in," or inaugurating the operation of this class of ore-smelting furnaces. Preparatory to initially filling the shaft or charge-chamber, a fusible or analogous reducible support—preferably in the form of a grate,—is inserted across the hearth-opening, and has or may have perforations or spaces through which the flames may pass upwardly into the charge and thus partially fuse, or make adhesive, a mid-portion of a lower layer of the ore before the support or grate is so far reduced or melted as to fall down.

The improved smelting furnace illustrated in the accompanying drawings, may be considered as belonging to a special class,—quite distinct and different from the usual "cupola" forms of smelting furnaces,—which is characterized by the absence of non-conducting walls and heat-retaining walls, and by the system and arrangement of metal framework and walls provided with wall-cooling, water-circulating, air-heating and flame-concentrating means and apparatus, these being organized for conjoint operation in a continuous and regulable manner, whereby to carry on the smelting operation in a restricted area or space that may be said to be inclosed within the interior of the body or mass of the charge itself, which thus forms an inclosing and continuously-renewed wall for such smelting space, zone or chamber.

In the accompanying drawings, which form a part of this specification, Figure 1 is a plan view of the lower portion (below the line $x^2$, Fig. 3) of a furnace made in accordance with our present invention.

Fig. 2 is a sectional elevation on the line $x^2$—$x^2$ of Fig. 1 of that portion of the furnace which is shown in Fig. 1, but with the front-wall and some interior-parts and details broken away to more clearly illustrate a preferred construction and arrangement.

Fig. $2^a$ is a fragmentary sectional view in line $x^{2a}$ of Fig. 1, for more fully showing some details of the water-cooled framework and of the air-supply arrangements.

Fig. 3 is a sectional elevation of the complete furnace, as seen from the left hand in Figs. 1 and 2, and with the transverse plane of the section located about midway of the length of the furnace.

Fig. $3^a$ is an enlarged detail view of one of the series of air-jet burners and Fig. $3^b$ is a further enlarged cross-sectional view in line $x^{3b}$, of Fig. $3^a$, for showing a preferred arrangement of certain details, as hereinafter more fully described.

Fig. 4 is an enlarged view corresponding to the lower portion of Fig. 3, and having diagram lines illustrative of certain structural relations and operational features hereinafter explained.

Fig. 4ª is a detail view supplemental to Fig. 3, and explanatory of a preferred arrangement of the peep-hole device.

Figs. 5 and 6 are diagrams illustrative of certain functions and relations of the hearth-walls of the furnace-hearth, and of the mode of action thereof in connection with other parts and features of the complete furnace.

Figs. 7 and 8 are diagrammatic plan views,—drawn to a small scale and corresponding with Fig. 1,—for illustrating some modifications of the hearth of the furnace, which are permissible in some instances, within the purview of our invention.

Similar reference characters designate like parts in all the views.

The drawings illustrate the working chambers and also various details inclosed within or by a framework or casing which is arranged to be water-cooled throughout. This frame or casing is also shown made up in halves, which may be constructed separate, and afterward detachably connected together by bolts, or preferably by rivets which can be readily cut away and replaced by others, as occasion may require. These various features, together with the preferred organization of wall-plates, water and air chambers or spaces, circulating and heating pipes, and other and similar features, are clearly represented by the lines of the drawings, Figs. 1 to 4, inclusive, so that only a brief description thereof in detail will be now required, especially since those improvements, so far as the same are not defined in the claims hereof, are intended to constitute in part the subjects-matter of other applications to be filed by us and concurrently pending herewith.

The furnace is shown in Figs. 2, 3, 4, resting upon a base or foundation, R, which, in practice, may be of any suitable and convenient character. The framework is arranged to inclose an elongated charge-chamber, C, and when made in this form, consists of a water-jacket shell comprising the hollow side-walls, $m^2$, $m^{2\prime}$, and the end-walls $m^3$, $m^{3\prime}$. A series of horizontally located water-cooling and air-heating flues, $4^e$, $4^{e\prime}$, are located within the water-jacket walls of the smelter shaft, or charge-chamber, C, which is the inner ore-carrying shaft of the smelter, and the side-walls of which, $3^a$, are vertical. At the base of the chamber C, the walls $3^b$, are inwardly converging upon the curved lines, to form the charge-supporting hearth $3^g$ of the furnace. This hearth, comprising the walls $3^a$ and $3^b$, Fig. 2, is calculated to support and automatically sustain the ore in the furnace,—when fully charged and during operation,—at and above a certain effective focal point, as P, Fig. 4, and for this purpose said hearth-walls $3^b$, $3^{b\prime}$, are preferably of the shape in profile, of a parabola. An opening, J, in the furnace-hearth leads directly down into the unobstructed combustion chamber or burner-chamber, F, which is thus located below the inwardly converging curved or parabola shaped base or hearth of the ore-carrying shaft of the furnace. Said hearth-opening wall usually be temporarily closed by a charging grate as G, while charging and blowing-in the furnace. The crucible of the furnace is shown formed of two parts $5^b$, $5^{b\prime}$ and $5^c$, $5^d$, designate the slag and bullion tap holes, respectively; during operation the tap holes will be partly or wholly stopped from time to time as occasion may require. A series of oppositely-disposed and upwardly inclined burners, H, H', supply the gas or vaporized mixture of oil and air required as fuel; these burners are shown fitted with special air controlling devices as hereinafter more fully described. A series of withdrawable telescope peepers K, K', are provided through which to observe the state of the combustion and thus aid in controlling the operation of the furnace.

The charging grate, G, may be made of iron, or in some cases of slag cast into shape and placed temporarily over the opening J in the base of the ore-carrying shaft, and above the combustion chamber F; to prevent the ore passing through such opening into said chamber until such time as the shaft shall be sufficiently filled with ore to develop, by its weight and downward pressure, the inward jam or thrust resulting from the active principles embodied in the inwardly curved or parabola shaped converging hearth-walls, $3^b$, $3^{b\prime}$, as indicated by the theoretical tension lines in Fig. 4; afterward the grate G will be melted out during an early stage of the process of blowing-in the furnace, and is not replaced again until the furnace is blown out and has to be recharged. The usual ore-charging door 2, may be located at or near the top of the furnace, which may also have a suitable smoke flue or stack, as $2^a$. The main air-pipe $4^a$ has two branches, $4^b$, $4^c$, connecting with the air chambers, $4^d$, $4^{d\prime}$, from which the air passes through the flues $4^e$, $4^{e\prime}$, to the chambers $4^f$, $4^{f\prime}$, and $4^g$, $4^{g\prime}$ and thence through the burners H, H', to the combustion chamber F. Water tanks $m^4$, $m^{4\prime}$ may be located above the level of the upper ends of the water-jackets of the furnace, and may be connected therewith by the pipes $m^5$, $m^{5\prime}$ and $m^6$, $m^{6\prime}$ for securing a circulation of water in the water-jacket spaces of the furnace framework.

In the preferred embodiment of our invention herein illustrated, one of the important features consists in the charge-supporting and centering furnace-hearth G. This hearth is shown forming an inwardly converging base for the furnace shaft or chamber C, which is arranged and adapted for supporting and sustaining the charge of ore,—when the furnace is in operation,— above an open and unobstructed burner chamber, as F, located below said hearth.

The elongated charge-chamber, C, is herein shown provided with a furnace-hearth which may be described as comprising two charge-centering hearth-walls 3ᵇ, 3ᵇ′ having between them an elongated hearth-opening J, while the walled-in burner-chamber, F, is located below and is wider than said hearth-opening. The upper walls 6ᵃ, 6ᵇ, of the burner-chamber are joined (preferably in an integral manner) with said bottom walls of the charge-chamber and along the sides of said hearth-opening. A plurality of suitable air-jet burners H, H′, are arranged in two coacting series,—one series on either side and each series coöperative with the other,—and have their jet-ends (as 8, 8′, Fig. 4) located under, and hence are protected by, said upper walls of the burner-chamber from the fused metals and slags that fall through the hearth-opening and thence through the burner-chamber C into the receptacle E. Said jet-ends are each shown positioned to enter the burner chamber on an upward incline, and this incline or angle should be such that each burner will be directed to that side of said hearth-opening which is opposite thereto. The burners are positioned so that the jets therefrom combine and thus form a zone of intense combustion above the position of the burners and remote from the individual burners. Also each of the several burners or one burner of each coacting pair, should have means,—such as a valve or the like—for separately regulating the operation thereof. The burners H and H′ are each provided (see Figs. 3ᵃ and 3ᵇ) with an outer rotatable sleeve 50 which has openings 51 that coöperate with the openings 52 in the burner bodies H and H′ and have a toothed formation 53 thereon to mesh with the pinion 54 mounted on the shaft 55 journaled in the wall portion 56 and having a crank 57 on the outer side thereof for the manipulation thereof. These several features and arrangements will now be evident from Figs. 3 and 3ᵃ, by comparison with the other views and the description thereof.

The outline, as in plan view of the furnace-hearth may in some instances be in the form of a circle in which case the circuit of the hearth-wall will of course be of a uniform conformation throughout the length thereof, while the hearth-opening will be circular. When thus constructed and arranged a cross sectional view (not shown herein) taken in any direction across the hearth (as seen in plan view) will represent sectional forms, or profiles, of oppositely-disposed portions of the hearth as being similar and in oppositely inclined positions, respectively. This arrangement is indicated in Fig. 4, where the curved and inclined lines 3ᵇ, 3ᵇ′, represent such oppositely disposed profiles of the hearth-walls 3ᵃ, 3ᵃ′, respectively. When the circuit of the hearth is circular (or approximately of that form) the supporting power of the hearth as compared with the closing-in effect thereof upon the bottom portion of the charge will naturally be greater and hence with a circular "circuit" for the hearth the central opening may ordinarily be made relatively larger than when the elongated form of circuit is employed. This latter arrangement is illustrated in the principal views in the present application, and two extended and oppositely-disposed portions or zones, (as 3ᵇ, 3ᵇ′, Figs. 1, 7, 8), of the hearth-wall are shown arranged substantially in parallel upon the opposite sides, respectively, of the elongated hearth opening, as J, Fig. 1; in this view, said parallelly-disposed side portions or zones of the hearth wall are located between the dotted lines z⁶, z⁷, and are shown connected by substantially circular portions or zones extending around each end, respectively, of the elongated charge-chamber, J, thereby completing the circuit of the furnace-hearth, all in a manner which will now be clearly evident from a comparison of the several drawings as elsewhere herein described.

When the elongated form of the charge-chamber, and of the furnace-hearth and hearth-opening are employed, it is deemed to be desirable to make such elongation sufficient for using under said furnace-hearth and hearth-opening a series of pairs of coacting burners and preferably for a series of three or more of such pairs. This longitudinal extension or elongation should be made great enough so that in practice the material may freely descend more rapidly if required in any one part of the length of the hearth, as compared with the rate of descent at another point or points in the length of the hearth-opening. In the present instance the described elongation (see Fig. 1) is shown of a considerable amount or proportion, but in some cases even a greater relative elongation will be found desirable, (see Fig. 8).

In the operation of the elongated form of the furnace, and when this has a circular arrangement or form of construction of the end walls,—as indicated in the plan view in Fig. 1,—evidently the material of the charge normally will be supplied in much greater quantity to the extreme end portion of the hearth-opening than it will to a corresponding mid-portion of the length of said hearth-opening. Therefore in some cases, especially in furnaces of exceptionally large size,—it may be found desirable in practice to make the end walls of the furnace of only a slightly curved form or even in the form of flat transverse walls, and to locate such walls at or relatively near the ends of the elongated hearth-opening; in this case, of course, the said elongated and parallelly-disposed portions or zones of the furnace-hearth will constitute nearly or substantially the whole extent of the hearth-walls, and thus in some instances the hearth-wall,—considered as a whole,—may be said not to be so extended as to form a complete circuit. For illustrating these features, reference is made to Fig. 7, showing in plan view and on a small scale, an instance of the slightly curved end-walls, 3, 3', and to Fig. 8, similarly showing the elongated hearth when the charge-chamber has transverse end walls 3ᵃ, 3ᵃ'.

For convenience of description, we have described the furnace-hearth as consisting of a bottom wall which is adapted by construction and arrangement for both supporting the charge and for closing-in, or "centering" the material, and hence this bottom member may be properly designated as a "charge-centering" hearth. It will be understood, however, that in practice this form of furnace-hearth G will be of such a width in proportion to the width of the charge chamber C, (this chamber being sometimes designated as the "shaft" or "ore-shaft"); of such a degree of inclination; and arranged with a hearth-opening of such width and proportion, as will operate in any given case,—in view of the nature of the material then being treated,—to support the charge of ore or broken rock within the charge chamber during the time while the mid-part of the load which is directly over the hearth-opening and between the oppositely disposed parts of the furnace-hearth wall or walls. Thus the weight of the charge operating in connection with the charge-centering bottom wall, gradually and properly closes together the lower part of the charge in a progressive manner as the fusing operation proceeds. The inner portion or zone of the material thus subjected to the closing-in or charge-centering action, (as specially illustrated in Fig. 5) may be said to comprise some material (as at $p^7$, $p^{7'}$, Fig. 5), contiguous to the cooled walls $3^b$, $3^{b'}$, and other material (as at $p^6$, $p^{6'}$, Fig. 5) which is adjacent to the central fusing-zone and is in a state of incipient fusion, whereby it is softened and made more mobile.

The cross-section form or outline of the hearth-wall is designated as the profile thereof, and this profile, as the line $3^b$, $3^{b'}$, Fig. 6, is inclined downwardly toward the hearth-opening, and is preferably curved, so that the hearth will be not only inclined but also concaved, and thus will not only support the charge, but will also,—and simultaneously,—close together a lower and outer portion of the charge during the fusing away of the mid-part of such lower portion within a central zone that is directly above the hearth-opening and also directly between opposite portions of the hearth-wall circuit. For instance, in Fig. 5, the dotted line $p^9$ between the dotted lines $p^8$, $p^{8'}$, show the height of the space or zone within which the hearthwalls $3^b$, $3^{b'}$, are inclined, and the fusing-zone, will be directly between said walls, or circuit, and mainly within the same vertical zone, as $p^{10}$, occupied by the hearth-opening J.

In connection with the charge-supporting and centering hearth-walls and the elongated hearth-opening between them, the series of burners are arranged in pairs which are located each pair transversely of the hearth-opening, and the two burners of a pair are arranged in transverse positions relatively to each other while each is directed to said hearth-opening, and is separately regulable by adjustment or otherwise for properly combining the flames therefrom and then, or thereby, projecting the combined flame,—which then constitutes a fusing-flame,—upwardly through the hearth-opening into a fusing-zone which is above said hearth-opening. In some instances, such a regulation may be effected by an adjustment of one burner of the pair relatively to the other, and thus also regulate both the position and the intensity of the combined flame, or of the hottest region thereof, relatively, as to transverse direction,—to said bottom opening and fusing-zone. In other words, if one of the burners H is regulated by the crank 57 to vary the intensity of the flame, the other burner H' remaining constant at the time, the hottest zone will be shifted either toward or away from the burner H', and obviously if one pair of opposing burners H and H' is regulated to vary their intensity while an adjacent pair remain constant, the hottest zone will be shifted either toward or away from the first said pair of burners.

The burner-chamber, F, and the construction and arrangement thereof with and relatively to the furnace-hearth, the metal-receptacle, the jet-burners and the water-walls, constitutes one of the leading features of our present improvements. In these arrangements, the receptacle F is located relatively close up underneath the hearth-opening, J, while the burner-chamber itself is broadened out into the two oppositely-disposed bays, as $6^c$, $6^{c'}$, located beyond or outside of the normal range or path of the falling stream of metal and slag. Said bays or side portions of the burner-chamber are indicated at $6^c$, $6^{c\prime}$, Fig. 4, being located under the inclined lower walls $6^a$, $6^b$, respectively, of the water-cooled furnace-hearth; thus the bay space $6^d$ is bounded or closed-in by the angularly-disposed walls $6^a$, $6^c$, of which the latter, $6^c$, constitutes a wall-zone for receiving a series of inclined burners, as H, which are or may be removably and adjustably fixed therein by means of a suitable screw connection at $8^b$.

The air-and-fuel jets, as H, H′, (Fig. 4) issue with a relatively high velocity, and have a spreading form as they come together along the mid-line Y, and so mingle and combine in an intense combustion which, though beginning in the chamber F does not reach its maximum until carried well up through the hearth-opening J and into the fusing-zone within the hearth-zone of the charge-chamber; these actions and effects are indicated in a diagrammatic manner by the dash-and-arrow flame-lines in Fig. 4.

In practice the impact of said spreading streams or jets, $8^e$, $8^{e\prime}$, while operating to direct the main portion thereof upwardly in a concentrated manner indicated at $8^d$, also diverts or deflects some portions laterally and also downwardly,—this latter action being indicated at $8^e$, $8^{e\prime}$, with the result of filling the chamber C with mixing gases and flame having a sufficient heat to prevent a too large upward radiation of heat from the mass of molten metal, or of metal and slag, in the receptacle E.

Thus the arrangements and modes of action and coaction herein set forth, effect the smelting of the ores in a fusing zone which is within the described hearth-zone, and the melted materials after descending through a flame-filled chamber are then collected in a receptacle and there subjected to a protecting flame and heating from above, thereby effecting in some respects, a continuation of the reduction-treatment of the melted materials; this supplemental treatment, therefore, is analogous to the operations in an air-furnace of the well-known reverberatory kind, since the flame-filled chamber F serves as a protecting roof above the "bath" in said receptacle E.

The proper proportioning of gas and air,—or of air and oil, as the case may be,—may be readily determined and adjusted by means of the very simple regulating mechanism of the burners as shown. In practice, the operation of the furnace may be readily ascertained from time to time by means of the peep-holes illustrated. These peep-hole devices are designated as telescopic, since they are tubular and are arranged to be easily withdrawn for adjustment or repair.

For more clearly illustrating one of the features of the furnace, and also the mode of operation of the water-cooled metal hearth-walls, one of these walls is shown in the diagram, Fig. 5, marked off into successive zones, $z^1$, $z^2$, $z^3$, which are disposed parallel to the hearth-opening J, and which, from the upper zone $z^1$ to the lower zone $z^3$, are of successively-increasing curvatures transversely thereof. This series of zones, therefore, may be said to have, also, a successively-increasing angularity of position with reference to a meridian line, as $y_2$, located centrally of the charge-chamber C, or of the bottom opening J. The material on that side of the charge, (that is, between the curved hearth-wall $3^b$ and the outer-line $x$ representing the boundary of the unoccupied fusing-zone), is guided inwardly by said wall $3^b$, so that during the descending movement of the charge the outer portion thereof which is contiguous to said wall, will be gradually bent inwardly while the inner part of this same portion is being continuously fused away adjacent to said boundary line $x$.

In the diagram, Fig. 6, it will be noted that the inner and concaved surfaces of the two oppositely disposed hearth-walls $3^b$, $3^{b\prime}$, respectively, are located in substantial coincidence with symmetrically and oppositely disposed arcs of the parabolas $p^2$, $p^{2\prime}$. In this diagram, said hearth-wall arcs are also shown having between them a hearth-opening J, and having the narrow inner zones thereof, as $3^j$, $3^{j\prime}$, tangential to lines $p^{12}$, $p^{12\prime}$, which substantially coincide with the normal angle-of-repose of the material upon the metal surfaces of the wall. Also, it will be noted that taking the focal point P as a center, the arc $p^{14}$ (Fig. 5) occupied by said hearth-opening is substantially the one-fourth part of a circle. But in practice, this angle or space occupied may vary somewhat from said proportion but should preferably correspond with an arc of between one-fifth and three-fifths of a circle. By these means, the angular relationships of the said hearth-opening and the hearth-wall arcs become organized in such a peculiar manner as to provide more fully for an effective support of the charge while the lower and outside portions thereof are slid downwardly and inwardly upon the metal surfaces of the hearth-walls, in connection with the fusing out of the mid-portion at the base of the charge, as already described in connection with Figs. 1 to 5. In this peculiar organization of the furnace-hearth and the several features and components thereof, it will be understood that the operation of the furnace as regards these features is facilitated by the maintaining of the said metal-surface hearth-walls in a relatively cool condition for which purpose an ample amount of circulating water should be provided, thereby maintaining a constant status or relationship between the hearth-walls and the material directly supported by and sliding on those walls.

In the normal operation of the furnace the charge of material in the furnace-chamber is supported by the load-carrying base or hearth-walls, as 3ᵇ, 3ᵇ', and the mid-portion of the material is prevented from falling through the bottom opening, J, by the fusing together of the material immediately joining the focal zone $p^4$, this resisting effect taking place in connection with the peculiar supportive action resulting from the construction and relative disposition of the said oppositely disposed bottom walls 3ʲ, 3ʲ'.

In carrying out that part of our invention which relates to the blowing-in of the furnace,—to begin the smelting of the charge,—the perforated and fusible charge-supporting grate is placed and extends over said hearth-opening for initially supporting a mid-portion of the charge, and the series of coacting burners located in the burner-chamber are arranged and operated for concentrating the flames thereof against and through said grate for thereby fusing down said grate and stabilizing (by heating) the mid-portion of the charge while this portion is supported by the fusible grate. The effect of these operations is to stabilize to a self-supporting condition, (as against gravity and the pressure of the charge), said mid-portion of the charge by projecting heating flames through the perforations of the grate, and finally the fusing flames will be increased to the point of melting down the grate, after which the smelting operation will normally proceed in the continuous manner already described.

During a continued operation of the furnace, and owing to the features above indicated, and also owing to the oppositely inclined arrangements of the fusing jets delivered through a pair of burners, as H, H', (Fig. 4), the fusing jets coming together on about the middle line, as $y$, of the furnace naturally mingle together and are forced upwardly through said bottom opening J and thus coact together and operate with the greatest intensity in a focal zone immediately surrounding the focal point at P so that in practice the material forming the lower part of a charge will be fused or eaten away and thus leave the extremely lower end of the charge free for the two side portions thereof to gradually close together toward the said focal zone, this action occurring by a sliding movement of the combined material with a turning or shifting effect, whereby the said side portions of the charge slide downwardly and inwardly toward each other by a movement inwardly upon the parabolically-curved bottom walls 3ʲ, 3ʲ'. During this normal operation of the furnace should one of the side portions of the charge move downwardly with a greater velocity than the opposite side portion of the charge, such more rapidly descending portion will naturally be fused or eaten away as it comes to the fusing zone, or focal zone, and thus by a normal action within the mass of the charge cause the opposite portion of the material to move downwardly with a greater force and rapidity and thereby, automatically as it were, restore the balanced and relatively uniform progressive downward movement of the entire charge, and, also, do this with a minimum disturbance or irregularity of movement of the material within the different portions of the mass. The said several portions of the material and the coöperative fusing flames therefore coact together for the maintenance of the complete operation in a continuous manner and with a maximum degree of efficiency.

The foregoing arrangements and modes of action also provide for a further object and result which is regarded as particularly important for the maintenance of the furnace in constant operation at a substantially uniform rate of action and with the requisite degree of efficiency notwithstanding irregularity in the mixture of the material and the occasional presence in the charge of a mass of a relatively infusible or slowly fusible ores or other mineral. For instance, should an exceptionally obstinate or refractory mass become projected downwardly into or through the bottom opening J, the two burners, as H, H', Fig. 4, will then operate individually as blow-pipe fusing devices directly upon such protruding mass, while the downward movement of the charge,—immediately above such obstructed point,—is temporarily halted through the obstruction of the said bottom opening as against the upwardly moving combined flames of the two burners. Thus said burners may be said to operate somewhat individually, while acting with a combined effect upon such protruding obstacle or mass, which is thus fused and eaten away by a most intense action, since the two flames are then concentrated at a point considerably below the normal focal point of the upper fusing zone. On the reduction and disposal in this manner of any such obstruction, the two flames, as indicated at 8ᵉ, 8ᵉ', (Fig. 4) normally meet again and combine into an upwardly moving fusing flame which will gradually fuse or eat away such material as may in the meantime come to occupy the normal fusing zone, and in this manner gradually but rapidly restore the furnace to its proper mode of action and to the gradual bringing down of the charge in the more regular and normal manner already set forth.

The construction of the bottom walls 3ʲ, 3ʲ', in an elongated form and the arrangement of them in a parallel manner combined with a plurality of pairs of said coacting burners, secures a further advantage and mode of action which is one of the objects of our present invention. When each of the pairs of burners is operating in the normal manner set forth, of course the furnace charge will be operated upon, and will normally descend, equally throughout the length of the furnace-bottom. But should there be an obstruction at some one point, especially if near one end,—as, for instance at the right-hand end pair H, H', in Fig. 1,—the charge at the opposite end, (as for instance, at the left-hand end pair H, H'), will continue to descend and the burners to work normally while such an obstruction at such one point is being fused out. Thus where a plurality of three or more of the pairs of burners are employed,—with a length of furnace-hearth, or bottom, of proper length therefor,—an obstruction at only one pair of the burners still leaves a plurality of such pairs for continuing the smelting operation, so that the obstruction does not largely interrupt the operation as a whole, but only reduces the rate or extent of the smelting action.

A further feature of this plural-pair burner arrangement is that during the fusing out as described of an obstruction at one point, an adjacent pair of burners continues (normally and usually) the fusing of the charge in that part of the normal fusing-zone which is just one side of such obstruction, so that the obstructive mass is thus subjected to a compound, or complex treatment, applied on one side and above the hearth-walls by the combined flames of one pair of burners, and in (or below, as the case may be) the bottom-opening, J, by the concentrated action concurrently of the two individually-acting burners of another pair of burners. In order to secure this complex action in the best manner, the furnace-hearth is preferably made relatively long, so that in the charge-chamber, the column or charge of broken ore or rock, will readily move within itself sufficiently for properly supplying,—by a continuing descent,—the ore to all that part of said hearth where the burners are operating normally within the said normal fusing-zone, notwithstanding a temporary stoppage of such descending or supply movement in that part of said charge-chamber which is immediately above the obstructed point. Thus while the obstruction is attacked from opposite sides in such portion as may extend below the hearth-opening J, it is also attacked from another side in that portion thereof which is above such hearth-opening.

From the foregoing description as illustrated, it will now be evident that in the preferred form and arrangement of our improved furnace, the mode of action is normally of an intermittent kind in which,—in each of the described burner-zones,—the fusing action changes back and forth along the length of the hearth, in accordance with the variations in the character of the material and in the rate of supply thereof.

The improved means which we have devised for "blowing-in", or inaugurating the operation of the smelting furnace, consists of a support which permits the fusing-flames to pass into the charge, while being itself reduced or melted out. The fusible or analogous support is inserted across the hearth-opening, and has perforations or spaces through which the flames may pass upwardly into the charge and thus partially fuse, or make adhesive, a lower layer of the ore before the support or grate falls down. One suitable form of such a support is shown in section at G, Fig. 2, and may be in the form of a grate having side-bars $7^a$, center-bar $7^b$, ribs $7^c$, and flame-spaces $7^d$. After starting the burners, the air pressure should be raised to a point for getting a high intensity of the heat, sufficient to melt out the said support, but not to do this until after the material directly above shall have been heated at least to the point of incipient fusion. In this way the material may be said to be stabilized in that part of the charge which is directly over the hearth-opening, which thus, by a partial fusion, is made sufficiently self-supporting to bridge-across,—as by an arch,—from the hearth-wall on the one side, as 3, to the hearth-wall on the other side, as 3', and thereby prevent a premature settling down of the charge. A further improvement is to make the said initial load-supporting member, as G, of a "slag" composition which, on melting, will mingle with the slag from the charge, and so avoid any adverse metallurigical effects. In practice, such supports may be made in one or several pieces, and also may be cast into suitable form.

By care in replenishing the charge, and from time to time observing the upper surface thereof, the furnace attendants can readily discover the existence and the location of any considerable obstruction in the hearth-opening by noting the inequalities in the descent of the charge in different portions thereof, so that,—in accordance with an experience readily gained in operating upon any particular character of material,—they may from time to time vary the relative burden and downward pressure upon different portions in the length of the hearth-walls, by suitably varying the heights of the respective portions of the charge. Similarly, in the absence of any such obstruction, the attendants may ascertain by means of such observations in what part of the length of the hearth the normal progress of the smelting operation is proceeding most rapidly, so that the supply of air and fuel to the respective pairs of burners may be properly regulated from time to time as found desirable for equalizing or suitably regulating the rate of ore-reduction throughout the length of the furnace.

Having thus described our invention, we claim:

1. In a smelting furnace of the character described, the combination of a horizontally elongated charge chamber having the lower part of their walls downwardly and inwardly curved to form a furnace-hearth provided with a central elongated hearth opening having a width greater than its vertical depth; and oppositely disposed upwardly and inwardly pointing coacting burners arranged under said hearth and disposed in opposed pairs and adapted to combine their flames at a point just beneath said opening and to project the concentrated flames up through said hearth opening to points considerably above the opening.

2. In a smelting furnace of the character described, the combination of an elongated charge chamber having the lower part of their walls inwardly inclined to form a furnace-hearth provided with a central elongated hearth opening having a width three times greater then its vertical depth; and coacting burners arranged under said hearth, on opposite sides of the principal medial vertical plane of the furnace, and disposed in opposed pairs and adapted to combine their flames and to project the combined flames up through said hearth opening and concentrate them at points considerably above the opening.

3. In a smelting furnace of the character described, the combination of a horizontally elongated charge chamber having the lower part of their walls downwardly and inwardly parabolically curved to form a furnace-hearth provided with a central elongated hearth opening having a width three times greater than its vertical depth; a burner chamber beneath said hearth; and upwardly and inwardly pointing co-acting burners, arranged under said hearth, on opposite sides of the principal medial vertical plane of the furnace, and disposed in opposed pairs in planes intersecting at right angles said medial plane, and adapted to combine their flames and to project the combined flames up through said hearth opening to points considerably above the parabolic focus line of said hearth.

4. In a smelting furnace of the character described, the combination of a horizontally elongated charge chamber having the lower part of their walls downwardly and inwardly parabolically curved to form a furnace-hearth provided with a central elongated hearth opening having a width three times greater then its vertical depth; a burner chamber beneath said hearth; oppositely disposed upwardly and inwardly pointing co-acting burners arranged under said hearth on opposite sides of the principal medial vertical plane of the furnace, and disposed in opposed pairs in planes intersecting at right angles said medial plane, and adapted to combine their flames and to project the combined flames up through said hearth opening to points considerably above the parabolic focus line of said hearth; and means for separately regulating said burners thereby to permit position of said combined flame.

5. In a smelting furnace of the character described, the combination of a horizontally elongated charge chamber having a furnace-hearth provided with a central elongated hearth opening; burners arranged to project their combined flames up through said hearth opening and means for positioning of said flame.

6. In a smelting furnace of the character described, the combination of a horizontally elongated charge chamber having a furnace-hearth provided with a central elongated hearth opening; burners adapted to combine their flames and to project the combined flames up through said hearth opening; and means for separately regulating said burners thereby to permit positioning of said combined flame.

7. In a smelting furnace of the character described, the combination of a horizontally elongated charge chamber having the lower part of their walls downwardly and inwardly curved to form a furnace-hearth provided with a central elongated hearth opening; oppositely disposed upwardly and inwardly pointing co-acting burners arranged under said hearth, and adapted to combine their flames and to project the combined flames up through said hearth opening; and means for separately regulating said burners thereby to permit positioning of said combined flame.

8. In a smelting furnace of the character described, the combination of a framework having walls providing a fluid containing space therebetween and forming a charge chamber; heating means adapted to direct heating medium into said chamber; horizontal flues passing through said space and feeding said means.

9. In a smelting furnace of the character described, the combination of a framework providing a fluid containing space and forming a charge chamber and a hearth at the lower part of the charge chamber heating means adapted to direct heating flame into said chamber; and horizontal air flues passing through said space and feeding said means.

10. In a smelting furnace of the character described, the combination of a framework having walls providing a space therebetween and forming an upper charge chamber and a downwardly and inwardly inclined hearth at the lower part of the charge chamber and a downwardly and inwardly inclined hearth at the lower part of the charge chamber surrounding an elongated hearth; burners adapted to combine and direct heating flame through said opening; an air chamber partly surrounding said space and feeding the burners; and flues passing through said space and feeding the air chamber.

11. In a smelting furnace of the character described, the combination of a framework having two-plate walls providing a fluid-containing space therebetween and forming a lower burner chamber, an upper charge chamber and a downwardly and inwardly inclined hearth at the lower part of the charge chamber surrounding an elongated hearth opening between the chambers; burners adapted to combine and direct heating flame through said opening; an air chamber partly surrounding said space and feeding the burners; and horizontal flues passing through said space and feeding the air chamber.

12. In a smelting furnace of the character described, the combination of a horizontally elongated charge chamber provided with a space therein and a furnace-hearth; oppositely disposed upwardly and inwardly pointing opposed co-acting burners arranged under said hearth and adapted to combine their flames and to project the combined flames up through said hearth opening; a heating means for said chamber; a heat transferring fluid in said space; and horizontal air flues passing through said fluid and feeding said means.

13. In a smelting furnace of the character described, the combination of an elongated charge chamber provided with double walls and a furnace-hearth provided with a central opening; burners arranged to project flames up through said hearth opening; a heat transferring fluid in said space; and horizontal air flues passing through said fluid and feeding said burners.

14. In a smelting furnace of the character described, the combination of a horizontally elongated charge chamber provided with double walls forming a space between and having their lower part forming a downwardly and inwardly inclined furnace-hearth provided with a central hearth opening; coacting burners arranged under said hearth and adapted to combine their flames and to project the combined flames up through said hearth opening; a heat transferring fluid in said space; and horizontal air flues passing through said fluid and feeding said burners.

15. In a smelting furnace of the character described, the combination of a horizontally elongated charge chamber provided with double walls forming a space between and having their lower part forming a downwardly and inwardly inclined furnace-hearth provided with a central hearth opening and a burner chamber therebeneath; oppositely disposed upwardly and inwardly pointing opposed coacting burners arranged under said hearth and adapted to combine their flames and to project the combined flames up through said hearth opening; a heat transferring fluid in said space; air chambers partly surrounding said fluid and said burners; and air flues passing through said fluid and feeding said chambers.

16. In a smelting furnace of the character described, the combination of a horizontally elongated charge chamber having a hearth provided with an elongated hearth opening; and an elongated fusible supporting member extending over said opening.

17. In a smelting furnace of the character described, the combination of a horizontally elongated charge chamber having a furnace-hearth provided with an elongated hearth opening; an elongated fusible charge supporting member extending over said opening; and means for fusing said member.

18. In a smelting furnace of the character described, the combination of a horizontally elongated charge chamber having a furnace-elongated charge chamber having a central elongated hearth provided with a central elongated hearth opening; an elongated fusible charge supporting grate extending over said opening for initially supporting the charge; and burners adapted to project their flames up through said hearth opening.

19. In a smelting furnace of the character described, the combination of a horizontally elongated charge chamber having the lower part of their walls downwardly and inwardly curved to form a furnace-hearth provided with a central elongated hearth opening; an elongated fusible charge supporting grate extending over said opening for initially supporting the charge; an upwardly and inwardly pointing coacting burners arranged under said hearth in opposed pairs, and adapted to project their combined flames up through said hearth opening.

20. In a smelting-furnace of the character described, in combination, an upper charge-chamber; a lower burner-chamber; a horizontally-disposed furnace-hearth interposed between said upper and lower chambers, and comprising a pair of charge-supporting and transversely-curved metal-surfaces constituting hearth-walls and located in substantial coincidence with symmetrically and oppositely-disposed arcs of a parabola, and having between them a hearth-opening occupying a mid-arc of the same parabola and corresponding with an arc of substantially one-fourth of a circle, said walls also having a narrow inner zone thereof tangential to a line which substantially coincides with the normal angle-of-repose of the material upon the metal-surface of the wall.

21. In a smelting-furnace of the character described, in combination, an upper charge-chamber; a lower burner-chamber; a horizontally-disposed furnace-hearth interposed between said upper and lower chambers, and comprising a pair of charge-supporting and transversely-curved metal-surfaces constituting hearth walls and located in substantial coincidence with symmetrically and oppositely disposed arcs, respectively, of a parabola, and having between them a hearth-opening occupying a mid-arc of the same parabola and corresponding with an arc of between two-fifths and three-fifths of a circle, said walls also having a narrow inner zone thereof tangential to a line which substantially coincides with the normal angle-of-repose of the material upon the metal-surface of the wall.

22. In a smelting-furnace of the character described, in combination, an upper charge-chamber; a horizontally-disposed furnace-hearth located below said chamber, and comprising a pair of parallelly-disposed charge-supporting metal-surfaces which are transversely-curved and constitute hearth-walls located in substantial coincidence with symmetrically and oppositely-disposed arcs of a parabola, said walls having between them a hearth-opening occupying a mid-arc of the same parabola and corresponding with an arc of substantially one-fourth of a circle, and means located below said furnace-hearth and arranged for applying fusing-flames upwardly through said hearth-opening.

23. In a smelting-furnace of the character described, in combination, an upper charge-chamber; a lower burner-chamber; a horizontally-disposed furnace-hearth interposed between said upper and lower chambers, and comprising a pair of charge-supporting and charge-centering hearth-walls symmetrically and oppositely-disposed and having between them an elongated hearth-opening, an elongated fusible charge-supporting member extending over said hearth-opening for initially supporting the charge, and fusing means located in the burner-chamber and arranged for stabilizing, by heating, a mid-portion of the charge while supported by the fusible-member, and for then melting down said fusible means.

24. In a smelting-furnace of the character described, in combination, an upper charge-chamber; a lower burner-chamber; a horizontally-disposed furnace-hearth interposed between said upper and lower chambers, and comprising a pair of charge-supporting and charge-centering hearth-walls symmetrically and oppositely-disposed and having between them an elongated hearth-opening, an elongated fusible charge-supporting grate extending over said hearth-opening for initially supporting the charge, and a series of coacting burners located in the burner-chamber and arranged for stabilizing by heating a mid-portion of the charge while supported by the fusible grate, and for then melting down said grate.

25. In a smelting-furnace of the character described, in combination, an upper charge-chamber; a lower burner-chamber; a horizontally-disposed furnace-hearth interposed between said upper and lower chambers, and comprising a charge-supporting and charge-centering hearth-wall having a central hearth-opening; an elongated fusible charge-supporting grate extending over said hearth-opening for initially supporting the charge; and, a series of coacting burners located in the burner-chamber and arranged for concentrating the flames thereof against the underside of said grate for thereby fusing down said grate and stabilizing by heating a mid-portion of the charge while supported by the fusible grate.

26. In a smelting-furnace of the character described, in combination, an upper charge-chamber; a lower burner-chamber; a horizontally-disposed furnace-hearth interposed between said upper and lower chambers, and comprising a pair of charge-supporting and charge-centering hearth-walls symmetrically and oppositely-disposed and having between them a hearth-opening; an elongated fusible charge-supporting member extending over said hearth-opening for initially supporting the charge; fusing means located in the burner-chamber and arranged for stabilizing by heating a mid-portion of the charge while supported by the fusible member, and for then melting down said fusible member; and, hearth-cooling means arranged for resisting the over-heating of the hearth during the melting down of said fusible member.

RANDOLPH G. WARD.
WILLIAM R. WARD.